United States Patent [19]

Parulski et al.

[11] Patent Number: 5,595,389
[45] Date of Patent: Jan. 21, 1997

[54] METHOD AND APPARATUS FOR PRODUCING "PERSONALIZED" VIDEO GAMES USING CD DISCS

[75] Inventors: Kenneth A. Parulski, Rochester; Hans P. Baumeister, Churchville; Richard N. Ellson, Rochester, all of N.Y.

[73] Assignee: Eastman Kodak Company, Rochester, N.Y.

[21] Appl. No.: 175,806

[22] Filed: Dec. 30, 1993

[51] Int. Cl.⁶ .................................................. A63F 9/22
[52] U.S. Cl. .............................. 463/31; 463/30; 463/43; 463/1
[58] Field of Search ................................. 273/433–437, 273/85 G, 148 B; 395/152, 154; 364/410; 358/403

[56] References Cited

U.S. PATENT DOCUMENTS

| | | | |
|---|---|---|---|
| 4,305,131 | 12/1981 | Best | 364/521 |
| 4,333,152 | 6/1982 | Best | 364/521 |
| 4,445,187 | 4/1984 | Best | 364/521 |
| 4,521,014 | 6/1985 | Sitrick | 273/434 |
| 4,662,635 | 5/1987 | Enokian | 273/94 |
| 4,688,105 | 8/1987 | Bloch et al. | 358/335 |
| 4,710,873 | 12/1987 | Breslow et al. | 364/410 |
| 4,766,541 | 8/1988 | Bleich et al. | 364/410 |
| 4,931,956 | 6/1990 | Stapleton | 364/521 |
| 5,111,409 | 5/1992 | Gasper et al. | 395/152 |
| 5,149,104 | 9/1992 | Edelstein | 273/434 |
| 5,218,453 | 6/1993 | Kristy | 358/403 |
| 5,327,265 | 7/1994 | McDonald | 358/527 |
| 5,368,309 | 11/1994 | Monroe et al. | 273/437 |

FOREIGN PATENT DOCUMENTS 3275092  12/1991  Japan ................................ 273/435

OTHER PUBLICATIONS

J. M. Preston, "Compact Disc–Interactive A designer's Overview", Nov. 1988, Kluwer Technical Books, Devender, The Netherlands. p. 21, paragraph 2, 6; p. 32, paragraph 1, 3; p. 39; p. 88, p. 92.

Primary Examiner—Jessica J. Harrison
Attorney, Agent, or Firm—Edward Dugas

[57] ABSTRACT

A method and associated apparatus for forming a personalized video game by combining personalized images that may be taken of the game player(s) with for example the head of a game character so as to provide a video game wherein the game player(s) can see themselves as the main character The image of the player(s) may be formed using an electronic camera which provides as an output a digital representation of the player(s). The digital image is then accessed by the game software whenever the character is to be displayed. A plurality of different poses may be accommodated along with a plurality of different characters, each optionally represented by a different person's image.

9 Claims, 3 Drawing Sheets

METHOD AND APPARATUS FOR PRODUCING "PERSONALIZED" VIDEO GAMES USING CD DISCS

FIELD OF INVENTION

The present invention is related to the field of interactive video entertainment systems and more specifically to a system which permits a user to incorporate personalized information into "authored" software.

BACKGROUND OF THE INVENTION

Video games are a very popular form of entertainment. The latest high-end video games use CD discs to provide the game software. The quality of the graphics of these games is increasing rapidly, to the point where the characters and backgrounds portray people and places realistically rather than as cartoon-like block figures. As the graphics become more realistic, the users of video games will be interested in games which allow them to become more a "part of the action". The appeal of a "personalized" video games would be a greater sense of affinity to the game and a higher level of immersion of the users into the game environment. What is needed is a method and apparatus for easily and economically creating such "personalized" video games.

SUMMARY OF THE INVENTION

One embodiment of the invention calls for compact disc having recorded thereon an authored segment of data created from graphics and control information, and a personalized segment of data. The authored segment of data may represent a video presentation such as a video game.

More specifically, in a preferred implementation of this invention there is provided a means for producing "personalized" interactive entertainment, where a video game customer can use their own personal images as part of a video game. For example, a "cut-out" of their head may be used as the main character in the game, or a photo of their community may be used as a background for the game action. In one scenario of the invention, the customer goes to a store which creates the personalized video disk, and chooses the type of game they would like to purchase. The "cut-out" face images are produced by taking electronic photos of the customers in front of a blue screen background using poses pre-assigned for the particular game. Brief audio segments (from scripts for the particular game) and text (such as the players' names, birthdays, etc.) are optionally recorded, along with background images (such as favorite location photos or photos of the town where the store is located). These images and associated data can be obtained from a variety of sources including but not limited to, Kodak's Photo CD discs, scanned prints or negatives, video tape, digital cameras, or other forms of digital images or data. The personalized images and audio segments are automatically integrated into the game software and recorded onto a CD disc. To minimize the required recording time, the game software itself can be pressed into the disc during a premastering process. In this case, only the personalized data needs to be written to the disc. Prints incorporating the personalized images and/or data into the game cover artwork are made for the front and back of the jewel box which stores the CD disc.

From the foregoing it can be seen that a primary object of the present invention is to provide an interactive entertainment system that incorporates personalized images.

It is another object of the present invention to provide a video system that utilizes a storage medium having integrated personalized data and generalized game data.

Another object of the present invention is to provide a personalized video game.

Yet another object of the present invention is to provide personalized images in a multi-resolution format for use in video display and for printing.

The above and other objects of the present invention will become more apparent when taken in conjunction with the following description and drawings wherein like characters indicate like parts and which drawings form a part of the present invention.

DETAILED DESCRIPTION OF THE INVENTION

Figure 1:
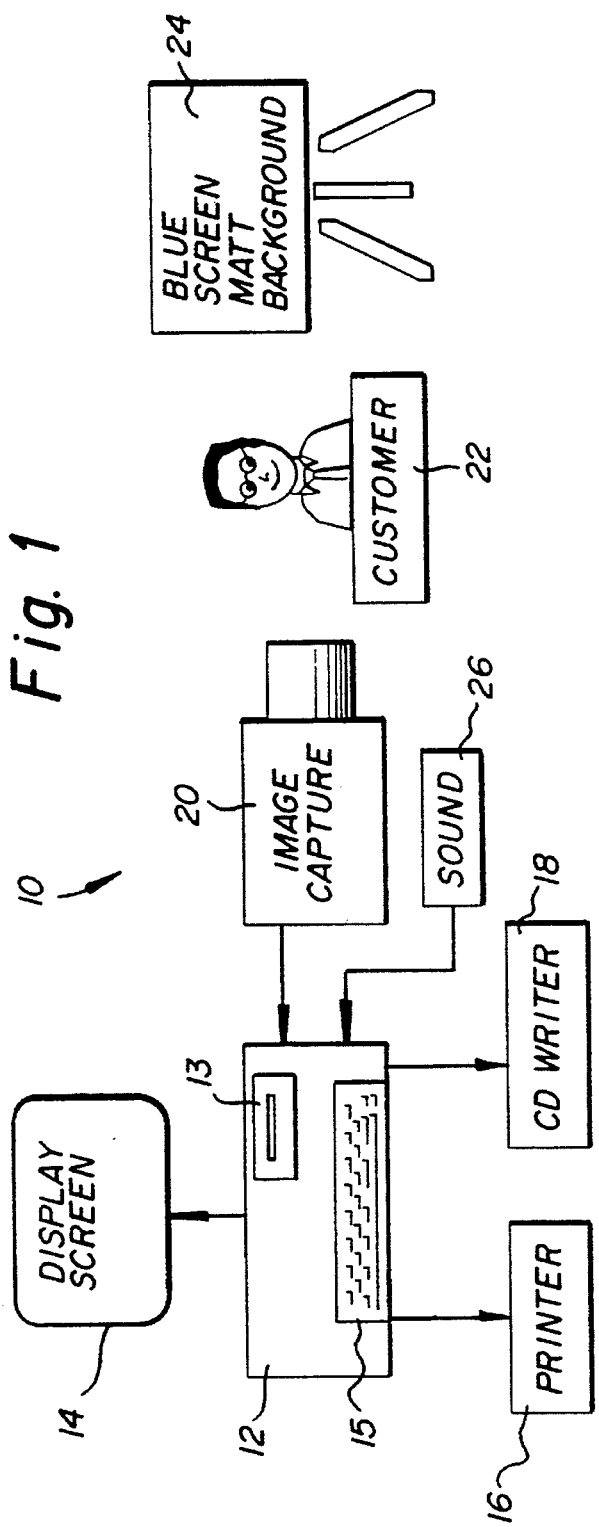
FIG. 1 illustrates in block diagram form one arrangement of a system for implementing the method of the present invention.

Referring to FIG. 1, one arrangment for a system 10, that is adapted for location at a retail establishment such as Blockbuster Video is shown with a processor 12, an integrated CD disc reader 13, and a keyboard 15. Additionally, there is provided a display screen 14 for viewing images and text, a printer 16, for printing outputs from the processor 12, a CD disc writer 18, an image capturing means 20 and optionally, a sound source 26, such as recorded background music, recorded speech, or other sound affects. Text may also be entered, by a keyboard 15 or by connection of the processor to other sources of digital text and or image information such as by connection to a MODEM, local area network, or even converted analog from RF or other like transmissions. The image capture means 20 functions to capture images such as the image of a customer 22 positioned against a blue screen matt background 24. The image capturing means optionally can be an electronic camera which provides digital images, either directly to the processor 12 or to an intermediate storage media such as a disc or tape that can be read into the processor 12.

In operation, a customer who decides to purchase a new personalized video game contacts a store operator. The store operator determines from the customer's selected game the corresponding personalization plan. The plan may be printed in an instruction book or recorded in electronic form on an instruction disc which can be accessed through the processor 12. The instructions may direct the operator to, for example, take four different poses (front and side views as well as different facial expressions) of up to two people in the customer's party, as well as enter their names and other information which might be relevant to the game (for example, their favorite car models and colors for an auto race game). The customer stands in front of the blue screen matt background 24 and the photos are taken using an electronic camera (such as a Professional DCS 200 Digital Camera System from Eastman Kodak Co.) The customer's voice may also be recorded saying a few key audio segments (like "I'm a winner!" for an auto race game). The electronic images are processed (to extract the head view and to delete the blue background) and converted to the proper graphics format used by the game software. For example, the customer's face may be stored as a graphics file which can be pasted into the cockpit of the race car, or onto a driver in a racing uniform receiving a trophy, at the appropriate point as the game is played.

Figure 2B:
FIGS. 2A and 2B, illustrate the difference between a typical non-personalized displayed character image and a "personalized" displayed character image.
Figure 2A:

FIGS. 2A and 2B, illustrate the difference between a typical character display (2A) from a "non-personalized" video game and a "personalized" video game (2B).

The main requirement of the personalized data is to get it into a form that the processor can work with. In almost all instances the data needs to be in digital from, as the processor 12 of choice, will be a digital computer, such as a PC computer. Other original image formats to be supplied to the processor 12 could be personal photos provided by the customer, which might be available as Photo CD still images, scanned images from negatives, transparencies, or prints. One example is a personalized puzzle game, similar to the non-personalized puzzle currently available as a CD-I video game. In the non-personalized version, the user has the choice of 64 still images of animals, places, etc. In the personalized version, the user would choose among their own images, which would make the puzzle much more appealing.

Once the personalization information is complete, it is written onto a writable-CD disc using a format appropriate for the video game player. For the CD-I puzzle game example, the CD-I format would be used. This personalization information must at present be written at the store, using a standard CD writer due to the cost of a CD writer. The "authored" portion of the video game software, which controls the game action and creates all of the non-personalized graphics, can either be written at the store or can instead be "pressed" into the disc when the CD disc is manufactured. At the present time interactive discs that are particurlary adapted for use with this system are called CD-I discs. The in-store recording time (and, therefore, the time needed to complete each customer transaction) can be greatly reduced when the "authored" material is prepressed. However, it may also be the case that in the interest of not degrading the speed of the video games graphics generation, the authored segment and the personalized segment may require more integration. In this case, the processor 12 can merge the personalized information with the authored information (which can be read from a pressed disk in reader 13) and write all the merged information onto the CD disk by the writer 18.

If the size of the software for the games is a small fraction of the capacity of the disc (approximately 600 MBytes), the pressed discs might contain the software for multiple games. The personalization information could include an access code word indicating which of the various games the customer had purchased so as to limit access to only the purchased software.

As personalization information is provided to the processor 12 it may be written to a disc and/or hardcopy prints can be produced by a printer, such as a Kodak 450GL thermal printer, and inserted in the front and back of the "jewel case" used to store the CD disc. Prints for both the game cover artwork and the personalized photos are thus made available to the customer. The game cover artwork and the personalized photos may combined into a single print. For the auto race example, they might include the customer seated in their favorite make and color race car on the front, and receiving the Indy 500 trophy on the rear.

In addition to the personalized image data used for the generation of video displays by the game software, personalized image data at a higher resolution can also be stored in the personalization segment of the disc. This higher resolution data can then be accessed in order to generate an image to be printed, as opposed to the lower resolution data used for video display. For example, an image of the winning car in an auto race could be shown crossing the finish line next to a personalized image of the car's driver and a timer indicating the winning time for the race.

Figure 3:
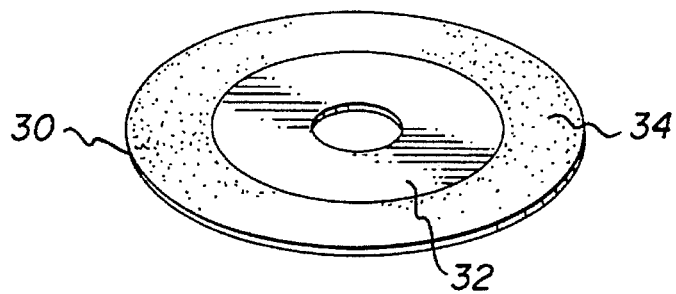
FIG. 3 is a diagram of the CD disc which contains a pressed area containing the "authored" part of the software for a video game, as well as a laser-written segment containing the personalized data part.

FIG. 3 illustrates one arrangement for a hybrid disc 30 which contains a pressed area 32 containing the "authored" part of the software for the game, as well as a laser-written segment 34 containing the personalization information.

Figure 4:
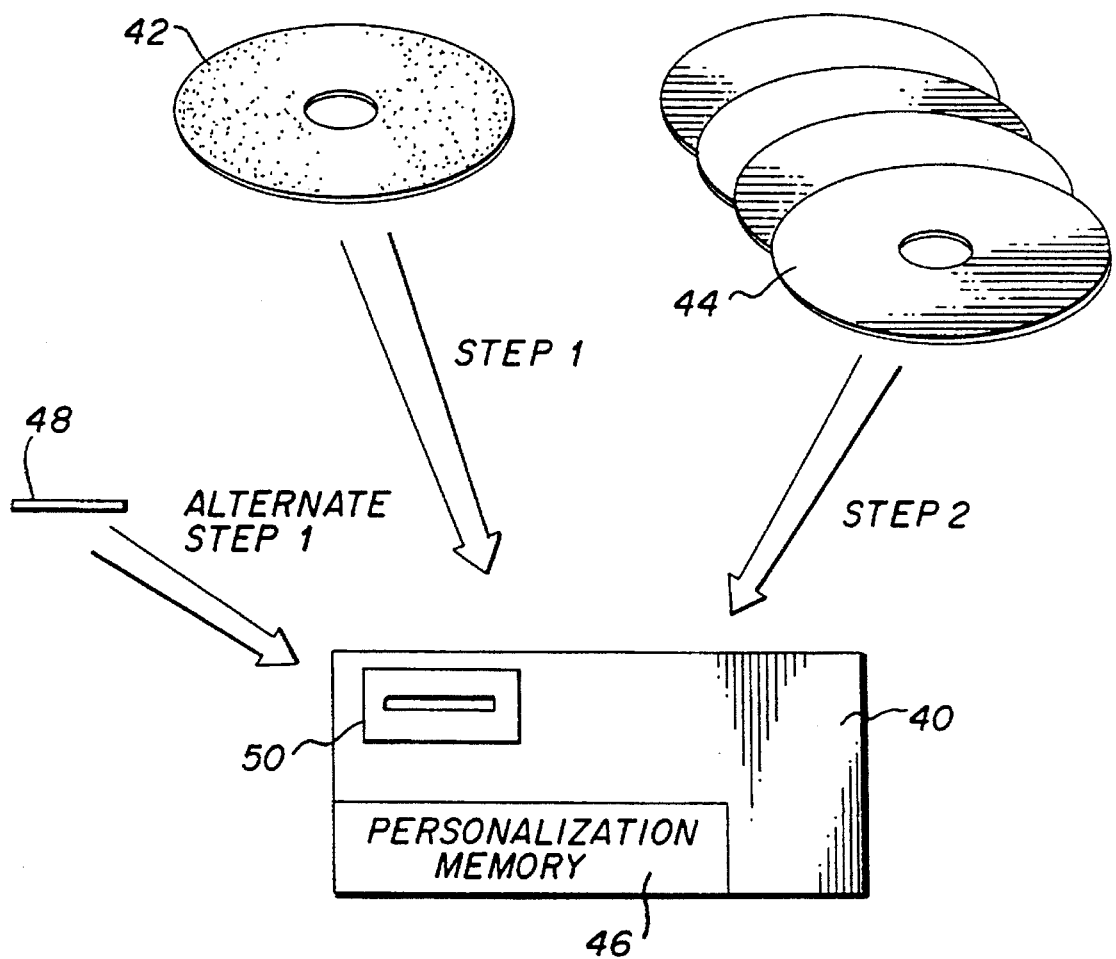
FIG. 4 illustrates an alternate system configuration in which a writable-CD contains only personalization images and data while the other CD discs contain the "authored" game software.

FIG. 4 shows an alternate embodiment of the invention wherein a first CD disc 42 is a writable-CD which contains only personalization images and data, while the other CD discs 44 are pressed CD's containing authored game software. The player 40 includes a digital memory 46 which stores the personalization information when the first CD disc 42 is inserted. Next, the first CD (personalization) disc 42 is removed and one of the game software discs 44 is inserted. The game now uses the stored personalization information (graphics, images, and/or audio segments) as the game is played. If no stored personalization information is present, the game uses standard pressed fictional players and audio segments from the pressed CD disc. As an alternative embodiment, the player 40 is provided with a CD reader 50 and a cartridge 48 or two CD readers, for providing the personalization information. The two readers would allow both the pressed disc and personalization disc to be available for reading simultaneously. Alternately, the personalization information could be stored in a non-volatile memory (i.e.: Flash EPROM) memory in a video game cartridge, which would be used with a pressed game disc.

Figure 5:
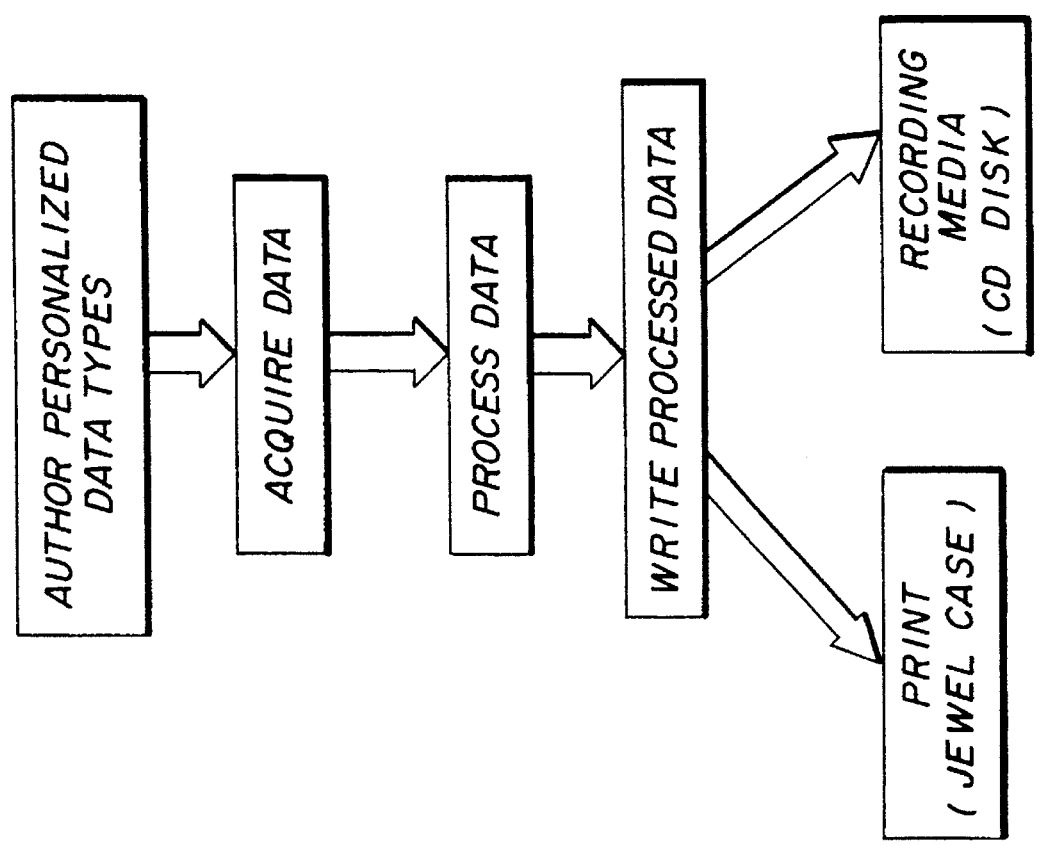
FIG. 5 is a flow chart depicting one of the methods of the present invention.

Refering to FIG. 5, with the process illustrated the type of personalized data that is required by the authoring software is determined and the data required to proceed is acquired from the necessary sources. As previously discussed the personalized data may be derived from negatives that are scanned and converted to digital images, from electronic cameras, or any other form of digital image that contains the image that is to be incorporated into a video presentation or game. The digital image data is processed by removing all of the information that is not necessary to represent, for example, the head of the customer. The processed data is then written to a recording media, such as a CD disc and to a hard copy printer with the resultant hard copy being, in one application, used with the case for the CD disk to provide an index of the personalized images that are incorporated in the game.

Figure 6:
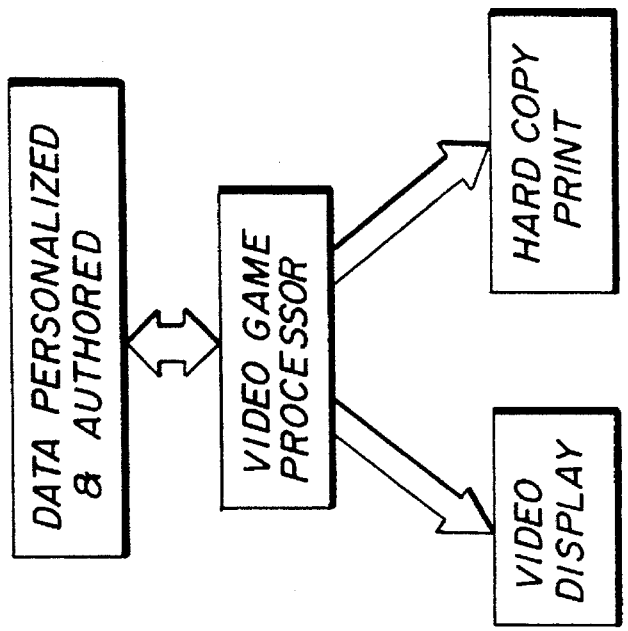
FIG. 6 is a flow chart depicting another method of the present invention.

In FIG. 6 the flow starts with data that represents both the personalized and authored portions of the game. The representation may have the data intermixed at the correct spots or all of one type of data may be separate from the other. The video processor receives the data and causes the execution of the game on a video display. At any selected time during play a hard copy of the displayed image may be made. This may involve generating a version of the displayed image at a higher resolution or a different aspect ratio in order to best match the hard copy output capability.

The hybrid disc 30 (illustrated in FIG. 3) is manufactured by RICOH corporation. The format for writing and reading such a disc is set out in the "Orange Book" which is an industry standard established by Sony and Philips.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

PARTS LIST

10 System
12 Processor
13 CD Disc Reader
14 Display Screen
15 Keyboard
16 Printer
18 CD Disc Writer
20 Image Capturing Means
22 Customer
24 Blue Screen Matt Background
26 Sound Source
30 Hybrid Disc
32 Pressed Area
34 Laser-Written Segment
40 Player
42 Personalized CD Disc (Writable-CD)
44 Other CD Discs (Pressed CD's)
46 Digital Memory
48 Cartridge
50 CD Reader

We claim:

1. A method of forming a personalized video game including the printing of a game character comprising the steps of:

storing a video game having at least one character on a non-volatile portable storage medium;

storing a low and a high resolution digital image of a person on the non-volatile portable storage medium;

reading and executing the stored video game;

accessing and combining said low resolution digital image with said at least one character to from a personalized character; and displaying said personalized character as a representation of the person; and accessing and combining said low or said high resolution digital image with said at least one character for driving a printer when a hard copy print is desired.

2. A method of forming and playing a personalized video game comprising the steps of:

storing a video game having at least one character on a non-volatile portable storage medium;

storing a plurality of low and high resolution digital image poses of a person on the non-volatile portable storage medium;

reading and executing the stored video game;

accessing and combining selected low resolution digital image poses with said at least one character to form a number of personalized versions of the character;

displaying the personalized versions of the character as a representation of the poses of said person; and printing the displayed personalized version of the character, with said low or said high resolution digital image pose.

3. A method of forming and playing a personalized video game comprising the steps of:

storing a video game having at least one character on a non-volatile portable storage medium;

storing a plurality of low and high resolution digital image poses of a person on the non-volatile portable storage medium;

reading and executing the stored video game;

accessing and combining selected low resolution digital image poses with said at least one character to form a number of personalized versions of the character; and storing said video game and said personalized versions of the character on a portable recording medium.

4. The method according to claim 3 and further comprising the steps of:

accessing and combining either said low or said high resolution digital image with said at least one character to form a personalized caricature; and printing a personalized hard copy of said formed caricature.

5. The invention according to claim 4 and further comprising the step of:

utilizing a printed personalized hard copy as part of the packaging of the formed personalized video game.

6. A system for forming a personalized video game including the printing of a game character comprising:

means for storing a video game having at least one character on a non-volatile portable storage medium;

means for storing a low and a high resolution digital image of a person on the non-volatile portable storage medium;

means for reading and executing the stored video game;

means for accessing and combining said low resolution digital image with said at least one character to from a personalized character;

means for displaying said personalized character as a representation of the person; and means for accessing and combining said low or said high resolution digital image with said at least one character for driving a printer when a hard copy print is desired.

7. A system for forming a personalized video game including the printing of a game character comprising:

means for storing a video game having at least one character on a non-volatile portable storage medium;

means for storing a plurality of low and high resolution digital image poses of a person on the non-volatile portable storage medium;

means for reading and executing the stored video game;

means for accessing and combining selected low resolution digital image poses with said at least one character to form a number of personalized versions of the character;

means for displaying the personalized versions of the character as a representation of the poses of said person; and printing the displayed personalized version of the character, with said low or said high resolution digital image pose.

8. A video game system comprising:

means for storing a video game having at least one character on a non-volatile portable storage medium;

means for storing a plurality of low and high resolution digital image poses of a person on the non-volatile portable storage medium;

means for reading and executing the stored video game;

means for accessing and combining selected low resolution digital image poses with said at least one character to form a number of personalized versions of the character; and means for storing said video game and said personalized versions of the character on a portable recording medium.

9. The system according to claim 8 and further comprising:

means for accessing and combining either said low or said high resolution digital image with said at least one character to form a personalized caricature; and means for printing a personalized hard copy of said formed caricature.

* * * * *